United States Patent
Osaka et al.

(10) Patent No.: US 9,611,376 B2
(45) Date of Patent: Apr. 4, 2017

(54) METHOD FOR PRODUCING PARTICLES AND APPARATUS FOR PRODUCING PARTICLES

(71) Applicants: Keiko Osaka, Shizuoka (JP); Chiaki Tanaka, Shizuoka (JP); Akira Suzuki, Miyagi (JP); Shinichiro Kawasaki, Miyagi (JP)

(72) Inventors: Keiko Osaka, Shizuoka (JP); Chiaki Tanaka, Shizuoka (JP); Akira Suzuki, Miyagi (JP); Shinichiro Kawasaki, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/434,338

(22) PCT Filed: Nov. 1, 2013

(86) PCT No.: PCT/JP2013/080362
§ 371 (c)(1),
(2) Date: Apr. 8, 2015

(87) PCT Pub. No.: WO2014/077206
PCT Pub. Date: May 22, 2014

(65) Prior Publication Data
US 2015/0267039 A1 Sep. 24, 2015

(30) Foreign Application Priority Data
Nov. 13, 2012 (JP) ................................ 2012-249119

(51) Int. Cl.
| | | |
|---|---|---|
| *B01J 2/04* | (2006.01) | |
| *C08K 5/3417* | (2006.01) | |
| *B29B 7/32* | (2006.01) | |
| *B29B 9/10* | (2006.01) | |
| *B01F 5/06* | (2006.01) | |
| *B01F 13/00* | (2006.01) | |
| *G03G 9/08* | (2006.01) | |

(52) U.S. Cl.
CPC .......... *C08K 5/3417* (2013.01); *B01F 5/0688* (2013.01); *B01F 13/0062* (2013.01); *B01J 2/04* (2013.01); *B29B 7/32* (2013.01); *B29B 9/10* (2013.01); *G03G 9/081* (2013.01)

(58) Field of Classification Search
CPC ...... B01J 2/04; B29B 7/32; B29B 9/10; B01F 5/0688; B01F 13/0062; G03G 9/081
USPC ................ 524/88; 264/13; 425/6, 8, 10
See application file for complete search history.

(56) References Cited

U.S. PATENT DOCUMENTS

| | | |
|---|---|---|
| 2006/0216629 A1 | 9/2006 | Miyakawa et al. |
| 2011/0218301 A1 | 9/2011 | Nemoto et al. |
| 2012/0112374 A1 | 5/2012 | Ohtani et al. |
| 2012/0129094 A1 | 5/2012 | Yamauchi et al. |
| 2012/0225377 A1 | 9/2012 | Yamauchi et al. |
| 2012/0322005 A1 | 12/2012 | Tanaka et al. |
| 2015/0043943 A1 | 2/2015 | Osaka et al. |
| 2015/0119484 A1 | 4/2015 | Osaka et al. |
| 2015/0132696 A1 | 5/2015 | Osaka et al. |

FOREIGN PATENT DOCUMENTS

| | | |
|---|---|---|
| JP | 2677685 | 7/1997 |
| JP | 2000-279774 | 10/2000 |
| JP | 2004-195307 | 7/2004 |
| JP | 2004-269598 | 9/2004 |
| JP | 3596104 | 9/2004 |
| JP | 2004-302323 | 10/2004 |
| JP | 2005-258394 A | 9/2005 |
| JP | 2006-293310 | 10/2006 |
| JP | 2007-256941 | 10/2007 |
| JP | 2007-268503 | 10/2007 |
| JP | 4113452 | 4/2008 |
| JP | 2011-121038 | 6/2011 |
| JP | 4811984 | 9/2011 |
| JP | 2011-206759 | 10/2011 |
| JP | 4840916 | 10/2011 |
| JP | 4963542 | 4/2012 |
| JP | 2012-086145 * | 5/2012 |
| JP | 2012-086175 | 5/2012 |
| JP | 4984116 | 5/2012 |
| JP | 2012-110888 | 6/2012 |
| JP | 2013-188938 | 9/2013 |

(Continued)

OTHER PUBLICATIONS

Combined Office Action and Search Report issued on Jan. 20, 2016 in Chinese Patent Application No. 201380059374.4 with English translation.
Extended European Search Report issued on Jul. 17, 2015 in the corresponding European Application No. 13855149.4.
International Search Report Issued Feb. 18, 2014 in PCT/JP2013/080362 filed Nov. 1, 2013.

(Continued)

*Primary Examiner* — Edward Cain
(74) *Attorney, Agent, or Firm* — Oblon, McClelland, Maier & Neustadt, L.L.P.

(57) ABSTRACT

To provide a method for producing particles, which contains: bringing a compressive fluid and a pressure plastic material into contact with each other using a multistage split flow micromixer, to thereby produce a melt of the pressure plastic material, in which the compressive fluid is dissolved; and jetting the melt of the pressure plastic material, to form particles, wherein the pressure plastic material is a resin having a carbonyl structure —C(=O)—, and wherein a viscosity of the melt is 500 mPa·s or lower, as measured under temperature and pressure conditions at the time of the jetting the melt of the pressure plastic material.

9 Claims, 5 Drawing Sheets

(56) References Cited

FOREIGN PATENT DOCUMENTS

| RU | 1823213 A1 | 5/1995 |
|---|---|---|
| WO | WO 2011/111861 A1 | 9/2011 |
| WO | WO 2013/165020 A1 | 11/2013 |
| WO | WO 2013/165022 A1 | 11/2013 |

OTHER PUBLICATIONS

Combine Russian Office Action and Search Report issued May 26, 2016 in Patent Application No. 2015122707/(035468).

\* cited by examiner

METHOD FOR PRODUCING PARTICLES AND APPARATUS FOR PRODUCING PARTICLES

TECHNICAL FIELD

The present invention relates to a method for producing particles and an apparatus for producing particles.

BACKGROUND ART

Recently, proposed has been a method for producing a toner, which include melting a thermoplastic resin and bringing the melt resin into contact with a compressive fluid, followed by mixing the melt resin and the compressive fluid by a conventional type of a static mixer, to reduce a viscosity of the melt resin, and decompress the obtained mixture to expand, to thereby produce a toner (see PTL 1). According to this proposed method, a toner can be produced with maintaining energy cost low.

In the case where fluids each having different viscosities, such as a melt resin and liquid carbon oxide, are mixed using a static mixer like in the case of PTL 1, however, it is difficult to homogeneously mix the both fluids together. As for the static mixer, known is a static mixer having a mixing element in a tube-shaped housing. The mixing element does not have a moving part, and has a plurality of baffle plates, which are aligned along the axial direction with the tube axis as a center. In the static mixer, a fluid is mixed by being split, turned about, and turned over by the mixing element provided in the tube, as the fluid go through inside the tube-shaped housing. As for another type of a static mixer, known is a mixer, in which, as a mixing element, a large number of honeycomb-shaped plates composed of small polygonal rooms are aligned to overlap each other.

In such static mixer, a fluid is mixed by being dispersed, turned over, and spin around, as the fluid sequentially moves through the small rooms in the tube from the centric part of the tube to the outer side, and the outer side to the centric part of the tube.

However, when a thermoplastic resin, which is a highly viscous fluid, and a compressive fluid, which is a low viscous fluid, are passed through in the static mixer, the compressive fluid is passed through a space between the mixing element and the tube-shaped element, without receiving a mixing action from the mixing element. As a result, the both fluids may not be homogeneously mixed. Therefore, the compressive fluid is not sufficiently dissolved in the thermoplastic resin, so that a viscosity of the thermoplastic resin is not sufficiently reduced. Even when the resulting mixture is expanded by decompression, diameters of obtained particles become large, e.g., several hundreds micrometers to several millimeters, and a particle size distribution of the particles becomes wide due to fusion of the particles, and generated fibrous products. Accordingly, there is a problem that it is difficult to produce a large amount of uniform particles having small particle diameters.

There are countermeasures for the aforementioned mixing failure, such as giving a mixing element a complex structure, and elongating a mixer. However, these countermeasures are not effective method for preventing the compressive fluid, which is a low viscous fluid, from passing through, and therefore there are problems, such as an increase in pressure loss during mixing, an enlarged device, and an increase in washing effort.

Accordingly, there is a need for providing a production method for producing particles having a narrow particle size distribution and having small particle diameters, in which a thermoplastic resin, which is a high viscous fluid, and a compressive fluid, which is a low viscous fluid, are brought into contact with each other to produce a melt, and jetting the melt to form particles.

CITATION LIST

Patent Literature

PTL 1: Japanese Patent (JP-B) No. 4113452

SUMMARY OF INVENTION

Technical Problem

The present invention aims to provide a method for producing particles, which can efficiently produce particles having a narrow particle size distribution.

Solution to Problem

As the means for solving the aforementioned problem, the method for producing particles of the present invention contains:

bringing a compressive fluid and a pressure plastic material into contact with each other using a multistage split flow micromixer, to thereby produce a melt of the pressure plastic material, in which the compressive fluid is dissolved; and jetting the melt of the pressure plastic material, to form particles, wherein the pressure plastic material is a resin having a carbonyl structure —C(=O)—, and wherein a viscosity of the melt is 500 mPa·s or lower, as measured under temperature and pressure conditions at the time of the jetting the melt of the pressure plastic material.

Advantageous Effects of Invention

The present invention can solve the aforementioned various problems in the art and can provide a method for producing particles, which can efficiently produce particles having a narrow particle size distribution.

DESCRIPTION OF EMBODIMENTS (Method for Producing Particles and Apparatus for Producing Particles)

The method for producing particles of the present invention contains a melting step, and a granulating step, and may further contain other steps, if necessary.

The apparatus for producing particles contains a melting unit, and a granulating unit, and may further contain other units, if necessary.

The method for producing particles of the present invention can be suitably carried out by the apparatus for producing particles of the present invention. The melting step can be suitably carried out by the melting unit. The granulating step can be suitably carried out by the granulating unit. The aforementioned other steps can be suitably carried out by the aforementioned other units.

<Melting Step and Melting Unit>

The melting step is bringing a compressive fluid and a pressure plastic material into contact with each other using a multistage split flow micromixer to produce a melt of the pressure plastic material, in which the compressive fluid is dissolved. The melting step is suitably carried out by the melting unit.

The term "melt of the pressure plastic material" means the pressure plastic material in the plasticized and/or liquidized state with swelling, as the pressure plastic material is in contact with the compressive fluid.

<<Pressure Plastic Material>>

The pressure plastic material is a material having characteristics that glass transition temperature thereof reduces as it is brought into contact with a compressive fluid with application pr pressure. More specifically, the pressure plastic material means a material that is plasticized by applying pressure without applying heat.

The pressure plastic material is plasticized at the temperature lower than the glass transition temperature (Tg) of the pressure plastic material under the atmospheric pressure, for example, as pressure is applied to the pressure plastic material by bringing into contact with a compressive fluid.

Figure 1:
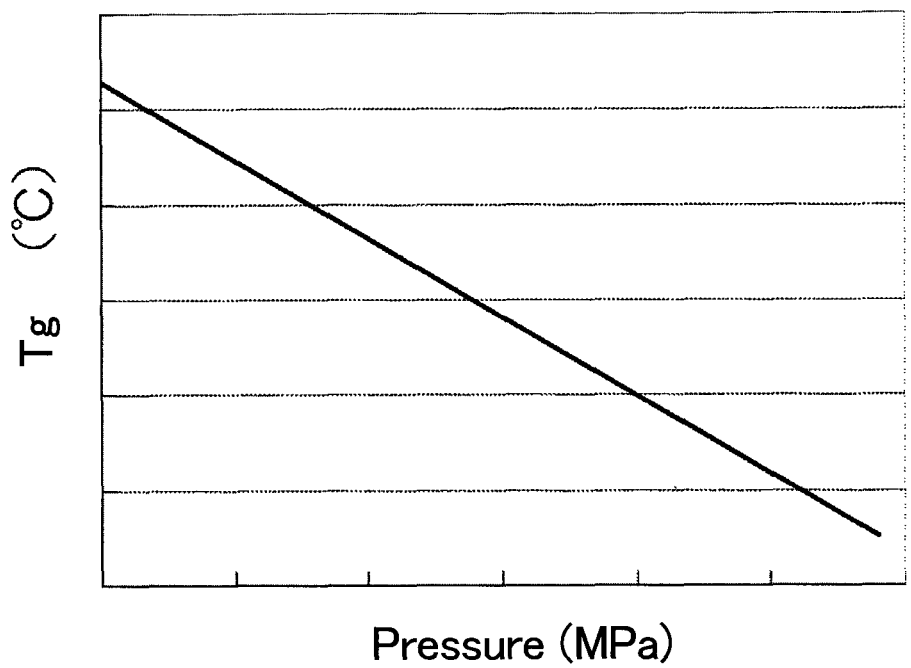
FIG. 1 is a diagram illustrating a relationship between glass transition temperature of a pressure plastic material, and pressure.

FIG. 1 is a diagram illustrating a relationship between the glass transition temperature (vertical axis) of polystyrene, as one example of the pressure plastic material, and the pressure (horizontal axis) in the presence of carbon dioxide as one example of the compressive fluid. As depicted in FIG. 1, the glass transition temperature of polystyrene and the pressure are correlated, and the gradient thereof is negative. Similarly, other materials can also form a graph depicting a relationship between glass transition temperature thereof and pressure. When a gradient is negative in the graph, the material is a pressure plastic material. The gradient varies depending on the type, composition, and molecular weight of the pressure plastic material. For example, when the pressure plastic material is a polystyrene resin, the gradient is $-9°$ C./MPa; when the pressure plastic material is a styrene-acryl resin, the gradient is $-9°$ C./MPa; when the pressure plastic material is a noncrystalline polyester resin, the gradient is $-8°$ C./MPa; when the pressure plastic material is crystalline polyester, the gradient is $-2°$ C./MPa; when the pressure plastic material is a polyol resin, the gradient is $-8°$ C./MPa; when the pressure plastic material is a urethane resin, the gradient is $-7°$ C./MPa; when the pressure plastic material is a polyacrylate resin, the gradient is $-11°$ C./MPa; and when the pressure plastic resin is a polycarbonate resin, the gradient is $-10°$ C./MPa.

The gradient can be determined based in the following manner. Specifically, grass transition temperature of the pressure plastic material is measured, for example, by means of a high pressure calorimeter C-80, manufactured by SETARAM Instrumentation with varying pressure applied, and the gradient is determined based on the results from the measurement. In the measurement above, a sample is set in a high pressure measuring cell, and the cell is then purged with carbon dioxide, followed by applying pressure to give the predetermined pressure to measure glass transition temperature of the sample. Moreover, the gradient can be determined based on the variation of the glass transition temperature when the pressure is changed from atmospheric pressure (0.1 MPa) to 10 MPa.

The gradient of the change in the glass transition temperature relative to the pressure is appropriately selected depending on the intended purpose without any limitation, but it is preferably $-1°$ C./MPa or less, more preferably $-5°$ C./MPa or less, and even more preferably $-10°$ C./MPa or less. The lower limit of the gradient is not particularly restricted. When the gradient is greater than $-1°$ C./MPa, plasticization is insufficient with application of pressure without applying heat, which cannot make the melt low viscous, and therefore it may be difficult to form particles.

The pressure plastic material is appropriately selected depending on the intended purpose without any limitation, but it is preferably a pressure plastic material having a viscosity of 500 mPa·s or lower at the conditions of 30 MPa or lower. Note that, in this case, the pressure plastic material may be made to have a viscosity of 500 mPa·s or lower at the conditions of 30 MPa or lower, by applying heat having the temperature equal to a melting point thereof or lower to the pressure plastic material at atmospheric pressure.

As for the pressure plastic material, a resin having a carbonyl structure, —C(=O)—, can be used.

The resin having a carbonyl structure —C(=O)— has excellent affinity to the compressive fluid, and exhibits a high plasticizing effect. Although specific principle has not yet been known, it is considered that reactivity thereof is high because of the following reason. In the carbonyl structure —C(=O)—, oxygen having high electronegativity is bonded to carbon through π-bond, and the π-bond electron is strongly attracted to the oxygen, and thus the oxygen is negatively polarized, and the carbon is positively polarized, which leads to high reactivity. In the case where the compressive fluid is carbon dioxide, moreover, such resin and the carbon dioxide have high affinity as the carbonyl structure —C(=O)— is similar to the structure of the carbon dioxide.

The resin having a carbonyl structure —C(=O)— is appropriately selected depending on the intended purpose without any limitation, and examples thereof include a polyester resin, a urethane resin, a polyol resin, a polyamide resin, rosin, modified rosin, and a terpene resin. These may be used alone, or in combination. Among them, particularly preferred are a polyester resin, and a urethane resin.

The polyester resin is appropriately selected depending on the intended purpose without any limitation, and examples thereof include a modified polyester resin, an unmodified polyester resin, a noncrystalline polyester resin, a crystalline polyester resin, and a polylactic acid resin.

The polylactic acid resin is appropriately selected depending on the intended purpose without any limitation, and examples thereof include an L-form, D-form, or racemic body polylactic acid resin, a polylactic acid resin of a stereo complex, and polylactic acid-based block copolymer.

The urethane resin is appropriately selected depending on the intended purpose without any limitation.

Other than the resin having a carbonyl structure —C(=O)—, other resins can also be used.

Examples of the aforementioned other resins include: a styrene-based copolymer, such as a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-α-chloromethyl methacrylate copolymer, a styrene-acrylonitrile copolymer, a styrene-vinylmethyl ketone copolymer, a styrene-isoprene copolymer, styrene-acrylonitrile-indene copolymer, a styrene-maleic acid copolymer, and a styrene-maleic acid ester copolymer; polymethyl methacrylate, polybutyl methacrylate, polyvinyl chloride, and polyvinyl acetate; and a polymer of a monomer (e.g., vinyl propionate, (meth)acrylamide, vinyl methyl ether, vinyl ethyl ether, vinyl isobutyl ether, vinyl methyl ketone, and N-vinyl pyrrolidone), a copolymer composed of two or more of the monomers, and a mixture thereof.

A viscosity of the melt of the pressure plastic material as measured under the temperature and pressure conditions at the time of jetting the melt is 500 mPa·s or lower, preferably 150 mPa·s or lower.

When the viscosity thereof is higher than 500 mPa·s, the viscosity of the melt is excessively high and therefore it is difficult to spray-dry the melt to form particles.

The temperature and pressure at the time of jetting the melt of the pressure plastic material means temperature and pressure of the melt supplied to a nozzle at the time of jetting in the granulating step.

The viscosity can be measured, for example, by charging a high pressure cell with a sample composed of the pressure plastic material and the compressive fluid (high pressure carbon dioxide), and performing a measurement by means of a vibration viscometer (XL/7, manufactured by Hydramotion Ltd.) at the temperature and pressure at the time of jetting the melt of the pressure plastic material (e.g., 120° C., 5 MPa). For the measurement of the viscosity, the sample is set in a measuring part, and the sample is then controlled to have the temperature and pressure at the time of jetting the melt of the pressure plastic material (e.g., 120° C., 5 MPa). When the viscosity of the sample becomes constant, such viscosity id determined as a viscosity at such temperature and pressure.

In the method for producing particles of the present invention, other components may be used in combination, other than the pressure plastic material, depending on properties, processability, etc of particles to be produced.

The aforementioned other components are appropriately selected depending on the intended purpose without any limitation, and examples thereof include a colorant, a surfactant, a dispersant, a releasing agent, and a charge controlling agent.

—Colorant—

The colorant is used when particles to be produced are color particles. The colorant is appropriately selected from known dyes and pigments depending on the intended purpose without any limitation.

Examples of the pigment include carbon black, nigrosine dye, iron black, Naphthol Yellow S, Hansa Yellow (10G, 5G, G), cadmium yellow, yellow iron oxide, yellow ocher, chrome yellow, Titan Yellow, Polyazo Yellow, Oil Yellow, Hansa Yellow (GR, A, RN, R), Pigment Yellow L, Benzidine Yellow (G, GR), Permanent Yellow (NCG), Vulcan Fast Yellow (5G, R), Tartrazine Lake, Quinoline Yellow Lake, anthracene yellow BGL, isoindolinone yellow, colcothar, red lead oxide, lead red, cadmium red, cadmium mercury red, antimony red, Permanent Red 4R, Para Red, Fiser Red, parachloroorthonitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Lithol Rubine GX, Permanent Red FSR, Brilliant Carmine 6B, Pigment Scarlet 3B, Bordeaux 5B, Toluidine Maroon, Permanent Bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanine blue, phthalocyanine blue, fast sky blue, indanthrene blue (RS, BC), indigo, ultramarine blue, iron blue, anthraquinone blue, fast violet B, methylviolet lake, cobalt purple, manganese violet, dioxane violet, anthraquinone violet, chrome green, zinc green, chromium oxide, viridian green, emerald green, pigment green B, naphthol green B, green gold, acid green lake, malachite green lake, phthalocyanine green, anthraquinone green, titanium oxide, zinc flower, and lithopone. These may be used alone, or in combination.

The dye is appropriately selected depending on the intended purpose without any limitation, and examples thereof include C.I. SOLVENT YELLOW (6, 9, 17, 31, 35, 100, 102, 103, 105), C.I. SOLVENT ORANGE (2, 7, 13, 14, 66), C.I. SOLVENT RED (5, 16, 17, 18, 19, 22, 23, 143.145, 146, 149, 150, 151, 157, 158), C.I. SOLVENT VIOLET (31, 32, 33, 37), C.I. SOLVENT BLUE (22, 63, 78, 83 to 86, 191, 194, 195, 104), C.I. SOLVENT GREEN (24, 25), and C.I. SOLVENT BROWN (3, 9). These may be used alone, or in combination.

As for the dye, moreover, a commercial product thereof can be used. The commercial product is appropriately selected depending on the intended purpose without any limitation, and examples thereof include: Aizen SOT dyes such as Yellow-1, 3, 4, Orange-1, 2, 3, Scarlet-1, Red-1, 2, 3, Brown-2, Blue-1, 2, Violet-1, Green-1, 2, 3, and Black-1, 4, 6, 8 (manufactured by Hodogaya Chemical Co., Ltd.); Sudan dyes such as Yellow-146, 150, Orange-220, Red-290, 380, 460, and Blue-670 (manufactured by BASF); Diaresin Yellow-3 G, F, H2G, HG, HC, HL, Diaresin Orange-HS, G, Diaresin Red-GG, S, HS, A, K, H5B, Diaresin Violet-D, Diaresin Blue-J, G, N, K, P, H3G, 4G, Diaresin Green-C, and Diaresin Brown-A (manufactured by Mitsubishi Chemical Industries. Ltd.); Oil Color Yellow-3G, GG-S, #105, Oil Color Orange-PS, PR, #201, Oil Color Scarlet-#308, Oil Color Red-5B, Oil Color Brown-GR, #416, Oil Color Green-BG, #502, Oil Color Blue-BOS, IIN, and Oil Color Black-HBB, #803, EB, EX (manufactured by Orient Chemical Industries, Ltd.); Sumiplast Blue-GP, OR, Sumiplast Red-FB, 3B, and Sumiplast Yellow FL7G, GC (manufactured by Sumitomo Chemical Co., Ltd.); and Kayaron Polyester Black EX-SF300, Kayaset Red-B, and Kayaset Blue-A-2R (manufactured by Nippon Kayaku Co., Ltd). These may be used alone, or in combination.

An amount of the colorant is appropriately selected depending on a coloring degree without any limitation, but the amount thereof is preferably 1 part by mass to 50 parts by mass relative to 100 parts by mass of the pressure plastic material.

<<Compressive Fluid>>

The compressive fluid is appropriately selected depending on the intended purpose without any limitation, provided that it is in the state of a fluid upon application of pressure, and examples thereof include a supercritical fluid, a subcritical fluid, and a liquid.

Examples of the compressive fluid include supercritical carbon dioxide, liquid carbon dioxide, methane gas, supercritical methane, ethane gas, supercritical ethane, supercritical propane, liquid propane, propane gas, supercritical butane, liquid butane, and butane gas. These may be used alone, or in combination. Among them, particularly preferred are those containing carbon dioxide, such as supercritical carbon dioxide, subcritical carbon dioxide, and liquid carbon dioxide.

—Supercritical Fluid and Subcritical Fluid—

The supercritical fluid is a fluid, which has intermediate characteristics of gas and liquid, is fast in mass transfer and heat transfer, is low in viscosity, and can continuously greatly change the density, dielectric constant, solubility parameter, free volume and the like by changing the temperature and pressure. Since the supercritical fluid has an extremely small surface tension compared to those of organic solvents, the supercritical fluid can follow a minute undulation (surface) to wet the surface with the supercritical fluid.

The supercritical fluid is appropriately selected depending on the intended purpose without any limitation, but it is preferably a supercritical fluid having low critical temperature and low critical pressure. Moreover, the subcritical fluid is appropriately selected depending on the intended purpose without any limitation, provided that it is present as a high pressure liquid or high pressure gas in the temperature and pressure regions adjacent to the critical point.

Examples of the supercritical fluid or subcritical fluid include carbon monoxide, carbon dioxide, nitrogen monoxide, ammonia, nitrogen, methane, ethane, propane, n-butane, isobutane, n-pentane, isopentane, and chlorotrifluoromethane. Among them, carbon dioxide is preferable because the critical pressure and critical temperature are respectively 7.3 MPa, and 31° C. and therefore carbon dioxide is easily turned into a supercritical state, and carbon dioxide is noninflammable and highly safe, and is easily collected and recycled as it is turned into gas only by returning back to the atmospheric pressure, and moreover, it is not necessary to dry obtained particles, waste liquids are not generated through the production thereof, and the obtained particles do not contain residual monomers.

The supercritical fluid or subcritical fluid may be used alone, or a mixture of two or more. Moreover, an organic solvent, such as alcohol (e.g., methanol, ethanol, and propanol), ketone (e.g., acetone, and methyl ethyl ketone), toluene, ethyl acetate, and tetrahydrofuran, may be added as an entrainer (cosolvent) into the supercritical fluid or subcritical fluid.

—Liquid Fluid—

The liquid fluid is appropriately selected depending on the intended purpose without any limitation, and examples thereof include liquid carbon dioxide, liquid methane, liquid ethane, liquid propane, and liquid butane. These may be used alone, or a mixture of two or more. Among them, liquid carbon dioxide is preferable, as it is noninflammable, and is highly safe to handle.

As the compressive fluid is easily separated from a target product, use thereof realizes a breakthrough method for producing particles, which does not use water or an organic solvent unlike the conventional method, and is low in the environmental load.

Figure 2:
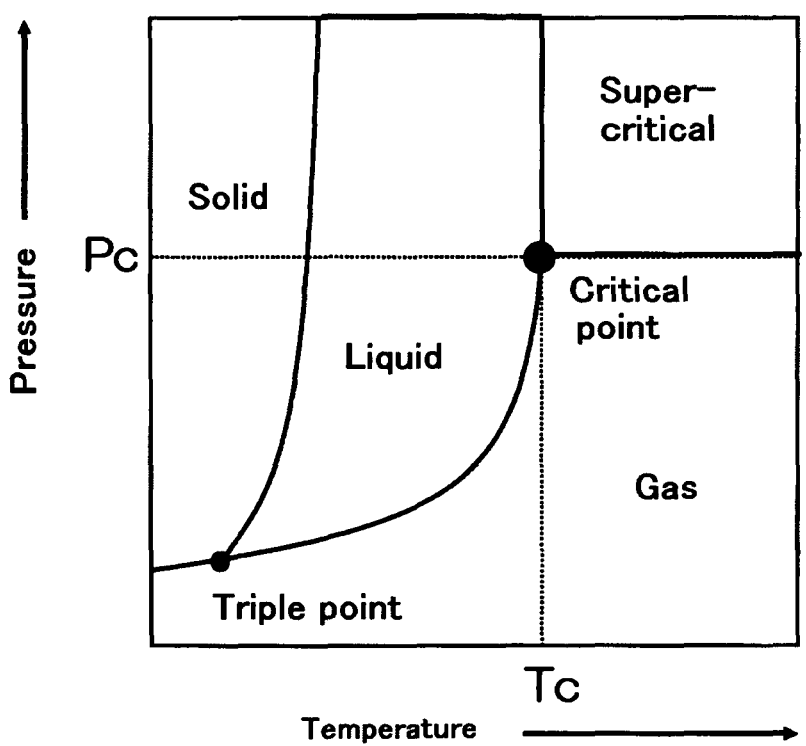
FIG. 2 is a phase diagram illustrating a state of a substance with respect to temperature and pressure.
Figure 3:
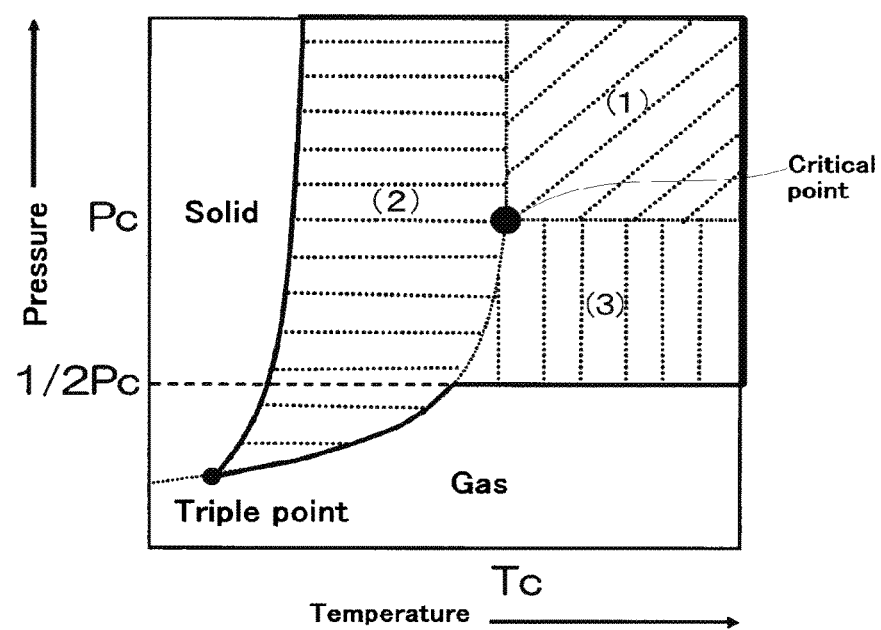
FIG. 3 is a phase diagram which defines a range of a compressive fluid.

The compressive fluid for use in the method for producing particles of the present invention is explained through FIGS. 2 and 3.

FIG. 2 is a phase diagram illustrating a state of a substance with respect to temperature and pressure. FIG. 3 is a phase diagram which defines a range of a compressive fluid. The compressive fluid has characteristics that it is fast in mass transfer and heat transfer, is low in viscosity, and can continuously greatly change the density, dielectric constant, solubility parameter, free volume and the like by changing the temperature and pressure. Since the compressive fluid has an extremely small surface tension compared to those of organic solvents, the compressive fluid can follow a minute undulation (surface) to wet the surface with the compressive fluid. Moreover, the compressive fluid can be easily separated from a product, such as a toner, by returning the pressure to atmospheric pressure, and therefore the compressive fluid is not remained in the product, unlike an organic solvent. Therefore, the method for producing particles can reduce environmental load due to the production, compared to the production using water or an organic solvent.

The compressive fluid refers to a state of a substance, which is present in any one of the regions (1), (2) and (3) of FIG. 3 in the phase diagram of FIG. 2. In such regions, the substance is known to have extremely high density and show different behaviors from those shown at normal temperature and atmospheric pressure. Note that, the substance present in the region (1) is a supercritical fluid. The supercritical fluid is a fluid, which exists as a noncondensable high-density fluid at temperature and pressure exceeding the limits (critical points), at which a gas and a liquid can coexist, is not condensed even when compressed, and is in the state at critical temperature or higher and critical pressure (Pc) or higher. Moreover, the substance present in the region (2) is a liquid, and means a liquid gas obtained by compressing a substance existing as a gas at normal temperature (25° C.), and atmospheric pressure (1 atm). Further, the substance present in the region (3) is a gas, but in the present invention, is a high-pressure gas whose pressure is ½ Pc or higher. In the case where the compressive fluid is carbon dioxide, the pressure is appropriately selected depending on the intended purpose without any limitation, but it is preferably 3.7 MPa or higher, more preferably 5 MPa or higher, and even more preferably 7.4 MPa (critical pressure) or higher.

<Multistage Split Flow Micromixer>

The multistage split flow micromixer is a device configured to homogeneously mix the compressive fluid with the pressure plastic material, which is supplied separately, to produce a melt, in which the compressive fluid is homogeneously dissolved in the pressure plastic material.

The multistage split flow micromixer contains a compressive fluid split section, a double tube mixing section, a contracted flow combining section, a first split kneading section, and a second split kneading section, and may further contain other members, if necessary.

—Compressive Fluid Split Section—

The compressive fluid split section is a member configured to split the compressive fluid into a plurality of circular tube flow channels, after the compressive fluid enters into the multistage split flow micromixer. A shape, structure, material, and size thereof are appropriately selected depending on the intended purpose without any limitation.

The material thereof is appropriately selected depending on the intended purpose without any limitation, and examples thereof include metal, such as stainless steel, aluminum, iron, and a chromium-based material.

The inner diameter of each of the circular tube flow channels is appropriately selected depending on the intended purpose without any limitation, but it is preferably 1 mm or smaller.

The number of the split circular tube flow channels of the compressive fluid split section is appropriately selected depending on the intended purpose without any limitation, but it is preferably 10 to 100, more preferably 20 to 80.

—Double Tube Mixing Section—

The double tube mixing section is a member, which is provided in the number identical to the split number of the compressive fluid split section in a downstream area from the compressive fluid split section; has a double tube structure composed of an inner tube into which the compressive fluid is flown in, and an outer tube provided to surround the inner tube, into which the pressure plastic material is flown in; and is configured to mix the compressive fluid and the pressure plastic material to form a contracted flow. A shape, structure, material, and size thereof are appropriately selected depending on the intended purpose without any limitation.

The material thereof is appropriately selected depending on the intended purpose without any limitation, and examples thereof include metal, such as stainless steel, aluminum, iron, and a chromium-based material.

An inner diameter of the inner tube and an inner diameter of the outer tube are appropriately selected depending on the intended purpose without any limitation, but they are both preferably 1 mm or smaller.

—Contracted Flow Combining Section—

The contracted flow combining section is a member, which is provided in a downstream area from the double tube mixing section, and is configured to combine the contracted flows formed by a plurality of the double tube mixing sections to form a mixed flow. A shape, structure, and material thereof are appropriately selected depending on the intended purpose without any limitation.

The material thereof is appropriately selected depending on the intended purpose without any limitation, and examples thereof include metal, such as stainless steel, aluminum, iron, and a chromium-based material.

—First Split Kneading Section—

The first split kneading section is a member, which is provided in a downstream area from the contracted flow combining section, and contains a plurality of circular tube flow channels that divide the first split kneading section, in each of which the mixed fluid is flown in. A shape, structure and material thereof are appropriately selected depending on the intended purpose without any limitation.

The material thereof is appropriately selected depending on the intended purpose without any limitation, and examples thereof include metal, such as stainless steel, and iron.

An inner diameter of the circular tube flow channel of the first split kneading section is appropriately selected depending on the intended purpose without any limitation, but it is preferably 1 mm or smaller.

A split number of the circular tube flow channels of the first split kneading section is appropriately selected depending on the intended purpose without any limitation, but it is preferably 20 to 150, more preferably 30 to 130.

—Second Split Kneading Section—

The second split kneading section is a member containing circular tube flow channels, a number of which are not identical to the number of the circular tube flow channels of the first split kneading section, and which are provided in positions that are not coaxial to the circular tube flow channels of the first split kneading section. A shape, structure, and material thereof are appropriately selected depending on the intended purpose without any limitation.

The material thereof is appropriately selected depending on the intended purpose without any limitation, and examples thereof include metal, such as stainless steel, and iron.

An inner diameter of the circular tube flow channel of the second split kneading section is appropriately selected depending on the intended purpose without any limitation, but it is preferably 1 mm or smaller.

A split number of the circular tube flow channels of the second split kneading section is appropriately selected depending on the intended purpose without any limitation, provided that it is not identical to the number of the circular tube flow channels of the first split kneading section, and the circular tube flow channel are provided in the positions that are not coaxial to those of the first split kneading section. The split number thereof is preferably 20 to 150, more preferably 30 to 130.

The multistage split flow micromixer can be composed so that mixing by the first split kneading section and mixing by the second split kneading section are repeatedly carried out to enhance a performance of mixing.

A plurality of the multistage split flow micromixers are preferably connected for use, as homogeneous mixing of the pressure plastic material and the compressive fluid can be achieved.

—Other Members—

Other members include, for example, a high pressure housing therein the compressive fluid split section, the double tube mixing section, the contracted flow combining section, the first split kneading section, and the second split kneading section, as the multistage split flow micromixer is used under high pressure.

In the case where particles of the pressure plastic material as produced are color particles, first, a colorant is placed in a pressure tank equipped with a thermoregulator, which is an example of a melting tank, in the melting step. If raw materials of the particles include a plurality of materials, these materials may be mixed in advance by means of a mixer, and may be melt-kneaded by a roll-mill. Nest, the thermoregulator-equipped pressure tank is sealed, and the raw materials of particles are stirred by a stirrer. The pressure plastic material turned into a melted state is continuously supplied to the high pressure condition by the pump. Meanwhile, the bomb stores carbon dioxide as one example of the compressive fluid. The pump, which is one example of a supply unit, pressurizes carbon dioxide stored in the bomb, and supplies carbon dioxide to the multistage split flow micromixer via a valve. The pressure plastic material in the melted state and the compressive fluid are mixed in the multistage split flow micromixer. Carbon dioxide used as the compressive fluid can be dissolved in the pressure plastic material to thereby reduce the viscosity of the pressure plastic material. Thereafter, a pressure-control valve can be optionally used for controlling the pressure of the melting step constant.

The predetermined temperature is appropriately selected depending on the intended purpose without any limitation, but it is preferably equal to or lower than thermal decomposition temperature of the pressure plastic material under the atmospheric pressure. The thermal decomposition temperature means the temperature at which the weight of the sample starts to decrease due to thermal decomposition of the sample in the measurement by means of a thermal analysis device (TGA: Thermo Gravimetry Analyzer).

When the predetermined temperature is higher than the thermal decomposition temperature of the pressure plastic material under the atmospheric pressure, the pressure plastic material may be deteriorated to reduce durability thereof, molecular chains of the pressure plastic material may be cut to reduce molecular weights thereof, discoloration or reduction in transparency may be caused due to oxidization of the pressure plastic material, or the consumption energy of the heat treatment may be increased.

The pressure applied to the compressive fluid in the melting step of the method for producing particles is appropriately selected depending on the intended purpose without any limitation, but it is preferably 1 MPa or greater, more preferably 10 MPa to 200 MPa, and even more preferably 31 MPa to 100 MPa. When the pressure applied to the compressive fluid is less than 1 MPa, a degree of a plasticizing effect so that particles are formed even if a resin is fluidized may not be obtained. There is no problem however high the pressure is. However, as the pressure is higher, the device for use becomes more complex, and therefore a cost for equipments becomes high.

<Granulating Step and Granulating Unit>

The granulating step is jetting the melt of the pressure plastic material to form particles. The granulating step is carried out by the granulating unit.

As for a method for granulating fine particles using carbon dioxide as the compressive fluid, there are rapid expansion of supercritical solution (RESS), and particles from gas saturated solution (PGSS).

The RESS is a rapid expansion process where a material as a solute is saturated and dissolved in the supercritical fluid under high pressure, and particles are precipitated utilizing rapid reduction in the solubility due to the rapid reduction in the pressure from the nozzle.

In the RESS, the pressure of the supercritical fluid is instantly reduced to the atmospheric pressure at the outlet of the nozzle, and along with this reduction in the pressure, the saturation solubility of the solute lowers. A large degree of supersaturation can be achieved within a short period of time, and therefore a large number of fine aggregation nucleuses are generated and the solute is precipitated without hardly any growth. As a result, particles of submicron order can be attained.

On the other hand, in the PGSS, the supercritical fluid is saturated and dissolved (at the saturation dissolution concentration or lower in the present invention) in a melted solution of the pressure plastic material, and the liquid is sprayed through the nozzle to rapidly reduce the pressure. As a result of the reduction in the pressure, the solubility of the supercritical fluid dissolved in the melted solution is rapidly lowered, and therefore the supercritical fluid becomes bubbles to separate the melted solution. In addition to the separation of the solution, a cooling effect due to adiabatic expiation results formation of particles.

The nozzle is a device for jetting the melt. A type of the nozzle is appropriately selected depending on the intended purpose without any limitation, and examples thereof include a direct-jet nozzle.

A diameter of the nozzle is appropriately selected depending on the intended purpose without any limitation, provided that the nozzle can maintain the pressure during the jetting constant. When the nozzle diameter is excessively large, the pressure before jetting is reduced excessively, so that the viscosity of the melt increases. As a result, it may be difficult to obtain fine particles. Moreover, there is a case where a large-sized supply pump may be necessary for maintaining the pressure. When the nozzle diameter is excessively small, on the other hand, the melt tends to be clogged in the nozzle, and therefore it may be difficult to obtain fine particles. Therefore, there is no upper limit for the diameter of the nozzle. The lower limit thereof is appropriately selected depending on the intended purpose without any limitation, but it is preferably 5 μm or greater, more preferably 20 μm or greater, and even more preferably 50 μm or greater.

Note that, the case where the melt containing the pressure plastic material and the compressive fluid is jetted into the air is explained above, but not limited thereto. In this case, the melt can be jetted into an environment where the pressure is higher than the atmosphere, but lower than the pressure inside the nozzle. By controlling the jet speed (outlet linear velocity), the control of particle diameters or particle size distribution can be improved. In this case, moreover, a cooling speed due to the Joule-Thomson effect can be changed, and therefore diameters of obtained particles can be controlled.

<Other Steps and Other Units>

Other steps are appropriately selected depending on the intended purpose without any limitation, and examples thereof include a drying step, a washing step, and a controlling step, which are respectively carried out by a drying unit, a washing unit, and a controlling unit.

Figure 4:
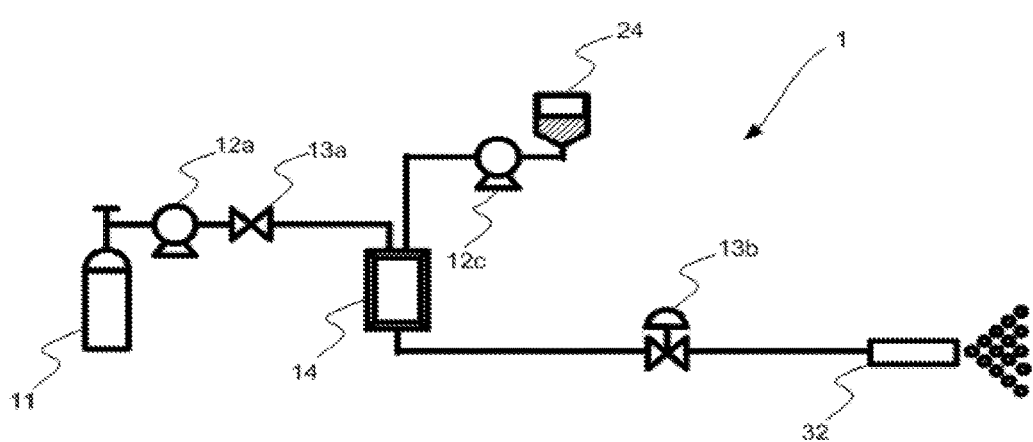
FIG. 4 is a schematic diagram illustrating one example of an apparatus for producing particles, for use in the method for producing particles of the present invention.

The apparatus for producing particles for use in the method for producing particles of the present invention is explained hereinafter with reference to drawings. FIG. 4 is a schematic diagram illustrating one example of the apparatus for producing particles for use in the method for producing particles.

In the apparatus for producing particles 1 illustrated in FIG. 4, a bomb 11, a pump 12a, and a valve 13a, which are connected with high pressure pipes, are provided as a first path for passing a compressive fluid. In the apparatus for producing particles 1, moreover, a pressure tank equipped with a thermoregulator 24 and a pump 12c, which are connected with a high pressure pipe, are provided as a second path for passing a pressure plastic material. In the apparatus for producing particles 1, moreover, a multistage split flow micromixer 14, to which the first path for passing the compressive fluid and the second path for passing the pressure plastic fluid are connected, and nozzle 32 are provided, and optionally a pressure-control valve 13b is provided.

The compressive fluid and pressure plastic material are both preferably heated in advance to enter into the multistage split flow micromixer 14, and a heating unit is provided for each of them (not illustrated).

Figure 5:
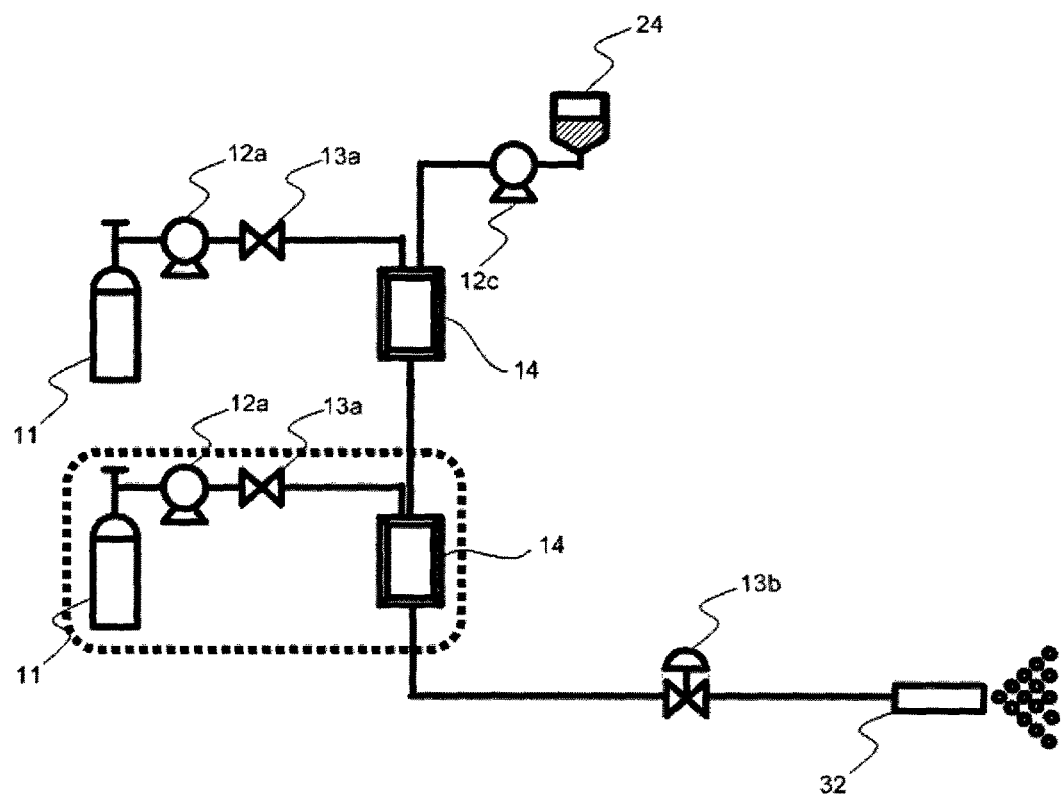
FIG. 5 is a schematic diagram illustrating another example of an apparatus for producing particles, for use in the method for producing particles of the present invention.

The apparatus for producing particles illustrated in FIG. 5 has two first paths each including the multistage split flow micromixer 14. As a result of the aforementioned configurations, the compressive fluid and the pressure plastic material can be homogeneously mixed.

Figure 6A:
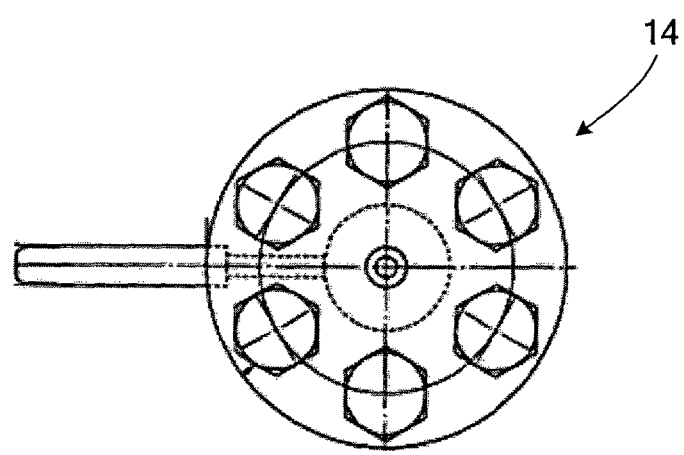
FIG. 6A is a schematic top view illustrating one example of multistage split flow micromixer.
Figure 6B:
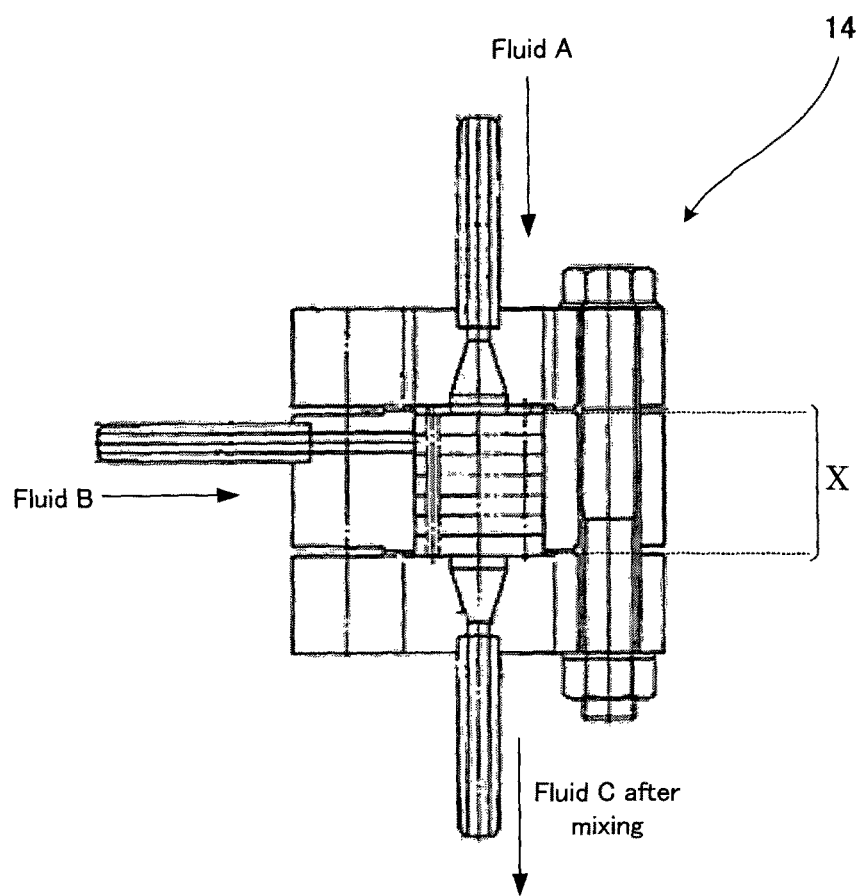
FIG. 6B is a schematic from view illustrating one example of a multistage split flow micromixer.
Figure 6C:
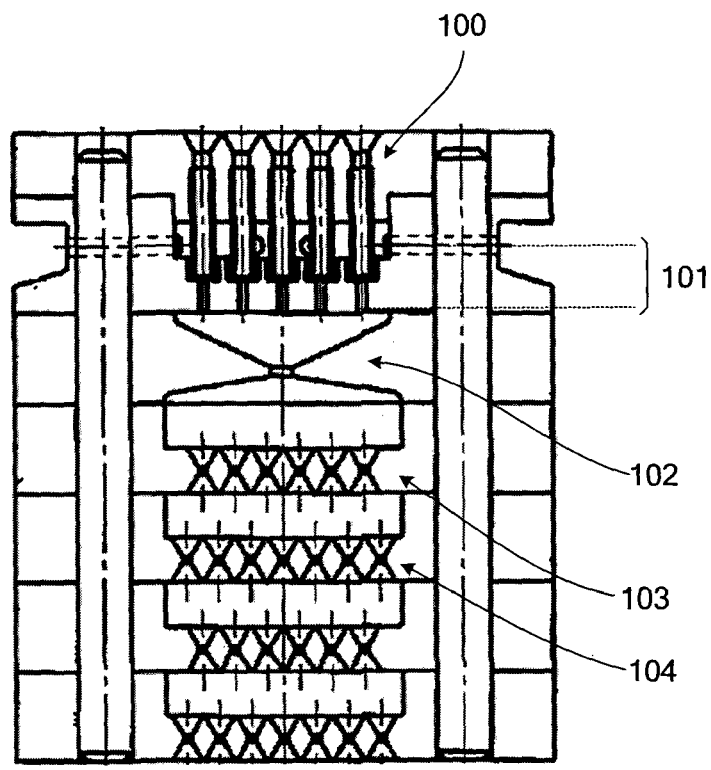
FIG. 6C is a schematic enlarged view of the X part of the FIG. 6B.
Figure 6D:
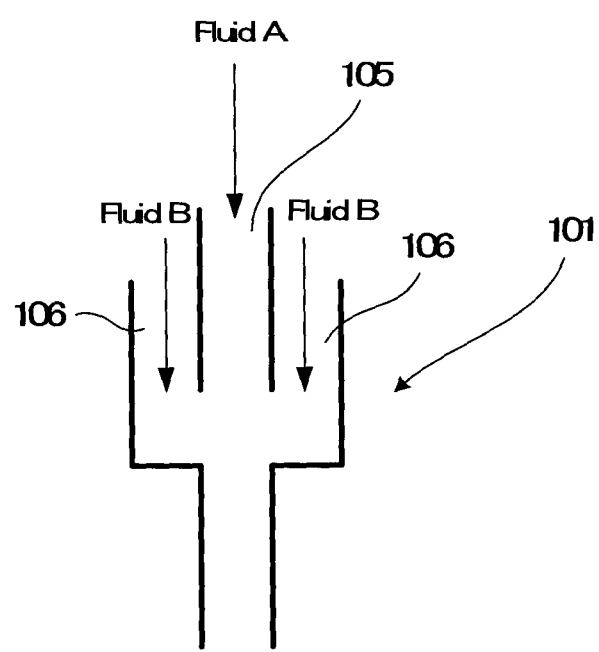
FIG. 6D is a schematic enlarged view of double tube mixing section 101 of FIG. 6C.

FIG. 6A is a schematic top view illustrating one example of the multistage split flow micromixer, FIG. 6B is a schematic front view illustrating one example of the multistage split flow micromixer, FIG. 6C is a schematic enlarged view of the X part of FIG. 6B, and FIG. 6D is a schematic enlarged view of the double tube mixing section 101 of FIG. 6C.

The multistage split flow micromixer 14 illustrated in FIGS. 6A and 6B is a multistage split flow micromixer configured to mix a compressive fluid represented as a fluid A and a pressure plastic material represented as a fluid B. C is a fluid obtained after the mixing.

As illustrated in FIG. 6C, the multistage split flow micromixer 14 contains: a compressive fluid split section 100 configured to split and guide the compressive fluid into a plurality of circular tube flow channels, after the compressive fluid is flown into the multistage split flow micromixer; a double tube mixing section 101 having a double tube structure composed of an inner tube into which the compressive fluid is flown in, and an outer tube provided to surround the inner tube, into which the pressure plastic material is flown in, where the double tube mixing section 101 is provided in the number identical to a split number of the compressive fluid split section 100 in a downstream area from the compressive fluid split section 100, and is configured to mix the compressive fluid and the pressure plastic material to form a contracted flow; a contracted flow combining section 102, which is provided in a downstream area from the double tube mixing section 101, and is configured to combine contracted flows formed by a plurality of the double tube mixing section to form a mixed fluid; a first split kneading section 103, which is provided in a downstream area from the contracted flow combining section 102, and contains a plurality of circular tube flow channels that divide the first split kneading section, in each of which the mixed fluid is flown in; and a second split kneading section 104 containing circular tube flow channels, a number of which is not identical to the number of the circular tube flow channels of the first split kneading section 103, and which are provided in positions that are not coaxial to the circular tube flow channels of the first split kneading section 103.

The multistage split flow micromixer 14 in the present embodiment, the split number of the circular tube flow channels of the compressive fluid split section 100 is 21, the number of the double tube mixing sections 101 is 21, the number of circular tube flow channels of the first split kneading section 103 is 32, and the number of the circular tube flow channels of the second split kneading section 104 is 37.

In the multistage split flow micromixer 14, an inner diameter of a channel of at least one or more members selected from the compressive fluid split section 100, the double tube mixing section 101, the first split kneading section 103, and the second split kneading section 104 is in the micro-order, i.e., 1 mm or smaller.

In FIG. 6B, for example, the fluid A is supercritical carbon dioxide, and the fluid B is a pressure plastic material. The fluid C is the mixed melt.

As illustrated in FIG. 6D, the fluid A and the fluid B are homogeneously mixed by a double tube mixing section 101 containing an inner tube 105, and an outer tube 106 provided to surround the inner tube.

As the multistage split flow micromixer 14 is used under high pressure, a high pressure housing to house the constitutional members of the multistage split flow micromixer is provided.

The multistage split flow micromixer 14 is composed in the manner that mixing by the first split kneading section 103 and mixing by the second split kneading section 104 are repeatedly performed, to enhance mixing performances.

In the apparatus for producing particles illustrated in FIG. 4, a bomb 11 provided on the first path configured to store and supply a substance (e.g., carbon dioxide), which will be a compressive fluid in the multistage split flow micromixer 14.

The substance stored in the bomb 11 is preferably air, nitrogen, or carbon dioxide in view of its cost and safety, and is more preferably carbon dioxide. The substance stored in the bomb 11 may be in the state of a gas or liquid, as long as it is turned into a compressive fluid by temperature control performed in the multistage split flow micromixer 14. In the case where the compressive fluid is carbon dioxide, for example, a substance stored in the bomb 11 is typically liquid carbon dioxide, and the liquid carbon dioxide is supplied with high pressure by a pump 12a. The valve 13a is a device configured to block the path between the pump 12a and the multistage split flow micromixer 14.

The pressure tank equipped with a thermoregulator 24 provided on the second path is a heat and pressure container for melting the pressure plastic material therein. The pressure plastic material is heated and melted in the pressure tank equipped with the thermoregulator 24. The pump 12c is a device for applying pressure to and sending out the obtained heat-melted liquid of the pressure plastic material. As for the pump 12c, a gear pump is typically used.

13b is a pressure-control valve, which is not essential, and is optionally provided, and the pressure-control valve is configured to control the pressure of the melt of the pressure plastic material, in which the compressive fluid is dissolved, constant.

The nozzle 32 is a member configured to jet the melt. A type of the nozzle 32 is appropriately selected depending on the intended purpose without any limitation, but it is preferably a direct-jet nozzle.

A diameter of the nozzle 32 is appropriately selected depending on the intended purpose without any limitation, but it is preferably 5 µm or greater, more preferably 20 µm or greater, and even more preferably 50 µm or greater.

The case where the apparatus for producing particles for use in the method for producing particles of the present invention is the apparatus for producing particles 1 illustrated in FIG. 4 is explained above, but the apparatus is not limited to this example. As for the apparatus for producing particles, a typical spray device used in the PGSS can be used.

(Particles)

The particles of the present invention produced by the method for producing particles of the present invention are, in terms of shapes, a size, and a material, appropriately selected depending on the intended purpose without any limitation. Examples thereof include color particles, such as a toner, a raw material of a cosmetic product, a raw material of a medical product, a raw material of food, and a raw material of chemical and pharmaceutical products.

The particles are substantially free from an organic solvent. In accordance with the method for producing particles, particles can be produced without an organic solvent, as a compressive fluid is used. As a result, particles, which are substantially free from an organic solvent, can be obtained. Note that, "the particles are substantially free from an organic solvent" means that an amount of the organic solvent in the particles as measured by the following method is equal to or less than the detection limit.

—Measurement Method of Residual Solvent Amount—

The residual solvent amount in the particles can be measured by the following method. To 1 part by mass of the particles, which are a subject of the measurement, 2 parts by mass of 2-propanol is added, and dispersed by ultrasonic wave for 30 minutes, and then the mixture is stored in a refrigerator (at 5° C.) for 1 day or longer, to thereby extract a solvent contained in the particles. A supernatant liquid is analyzed by gas chromatography (GC-14A, manufactured by Shimadzu Corporation), to determine the amounts of the solvent and residual monomers in the particle, to measure the concentration of the solvent.

EXAMPLES

Examples of the present invention are explained hereinafter, but these examples shall not be construed to as limit the scope of the present invention.

Synthesis Example 1

Synthesis of Polyester Resin 1 (Pressure Plastic Material)

A reaction vessel equipped with a cooling tube, a stirrer, and a nitrogen inlet tube was charged with 229 parts of a bisphenol A ethylene oxide (2 mol) adduct, 529 parts of a bisphenol A propylene oxide (3 mol) adduct, 208 parts, of terephthalic acid, 46 parts of adipic acid, and 2 parts of dibutyl tin oxide, and the mixture was allowed to react for 8 hours at 230° C. under the atmospheric pressure. The resultant was further allowed to react for 5 hours under the reduced pressure of 10 mmHg to 15 mmHg. Thereafter, 44 parts of trimellitic anhydride was added to the reaction vessel, and the resulting mixture was allowed to react for 2 hours at 180° C. under the atmospheric pressure to thereby yield Polyester Resin 1.

Polyester Resin 1 had the number average molecular weight of 2,500, weight average molecular weight of 6,700, glass transition temperature (Tg) of 43° C., and acid value of 25 mgKOH/g. The gradient of the graph depicting the relationship between the pressure and glass transition temperature thereof as measured in the following manners was −10° C./MPa.

<Measurement of Gradient of Graph Depicting Relationship between Pressure and Glass Transition Temperature>

The gradient of the graph depicting the pressure and glass transition temperature was measured by means of a high pressure calorimeter (C-80, manufactured by SETARAM Instrumentation). The measurement was performed in the following manner. Polyester Resin 1 as a sample was set in a high pressure measuring cell, and the cell was purged with carbon dioxide, followed by applying pressure to give the predetermined pressure. Then, the sample was heated to 200° C. at the heating speed of 0.5° C./min, to thereby measure glass transition temperature. A graph depicting a relationship between the pressure and the glass transition temperature was formed, and the gradient of the graph was obtained.

Example 1

Color particles were produced by means of an apparatus for producing particles, 1, illustrated in FIG. 4. In Example 1, a compressive fluid was obtained by heating and compressing carbon dioxide stored in the bomb 11.

<Raw Materials of Color Particles>

| | |
|---|---|
| Polyester Resin 1 | 95 parts by mass |
| Colorant (copper phthalocyanine blue, C.I. Pigment Blue 15:3, manufactured by Dainichiseika Color and Chemicals Mfg. Co., Ltd.) | 5 parts by mass |

After mixing the raw materials of color particles by a mixer, the mixture was melt-kneaded by a two-roll mill, and the kneaded product was rolled and cooled. This melt-kneaded product was provided to a pressure tank equipped with a thermoregulator 24 of the apparatus for producing particles 1 illustrated in FIG. 4, and was heated and melted at 120° C. The melt-kneaded product, which had been heated and melted, was supplied into the multistage split flow micromixer 14 illustrated in FIGS. 6A to 6D by pressurizing by a pump 12c, and at the same time, carbon dioxide as a supercritical fluid was supplied to the multistage split flow micromixer 14 in the manner that the temperature and pressure thereof were to be 120° C. and 5 MPa. The melt-kneaded product and the carbon dioxide as a supercritical fluid were mixed, to thereby produce a melt. The viscosity of the obtained melt (color resin melt) under the jetting conditions was measured in the following manner, and the result thereof was 450 mPa·s.

Next, in the aforementioned state, the pressure-control valve 13b was open, and the melt was jetted from the nozzle 32 having a nozzle diameter of 400 μm, to thereby obtain Color Particles 1.

Color Particles 1 were subjected to the measurements of a volume average particle diameter Dv, a number average particle diameter Dn, and a ratio Dv/Dn in the following manners. As a result, Color Particles 1 had the volume average particle diameter Dv of 72.4 μm, the number average particle diameter Dn of 9.39 μm, and the ratio (Dv/Dn) of 7.71.

<Viscosity of Melt under Jetting Conditions>

As for the measurement of the viscosity of the melt under jetting conditions, a vibration viscometer (XL7, manufactured by Hydramotion Ltd.) was used. A high pressure cell was charged with the melt (color resin melt) as a sample, and carbon dioxide was added thereto. Thereafter, the viscosity of the melt was measured at 120° C. and 5 MPa, which are the temperature and pressure at the time of jetting the melt. As for the measurement of the viscosity, the sample was set in the measuring part, and the temperature and pressure were controlled to 120° C. and 5 MPa.

When the viscosity became constant, such viscosity at such temperature and pressure was read as the viscosity of the melt under the jetting conditions.

<Volume Average Particle Diameter Dv, Number Average Particle Diameter Dn, and Ratio (Dv/Dn) of Color Particles>

The volume average particle diameter Dv, number average particle diameter Dn, and ratio (Dv/Dn) of the color particles were measured by means of a particle size analyzer (Coulter Counter TAII, manufactured by Bechman Electronics, Inc.).

First, to 100 mL to 150 mL of an aqueous electrolyte, 0.1 mL to 5 mL of a surfactant (polyoxyethylene alkyl ether, product name: DRIWEL) was added as a dispersant. As for the aqueous electrolyte, used was a 1% by mass NaCl aqueous solution (ISOTON-II, manufactured by Beckman Coulter, Inc.) prepared by using primary-standard sodium chloride. To the resultant, 2 mg to 20 mg of a measuring sample was added. The electrolyte solution, in which the sample had been suspended, was dispersed for 1 minute to 3 minutes by means of an ultrasonic wave disperser. The dispersion liquid was then subjected to the measurement by means of the aforementioned measuring device with using a 100 μm aperture as an aperture, to thereby measure the volume and numbers of the color particles. From the results as obtained, a volume distribution and a number distribution were calculated. The volume average particle diameter Dv and number average particle diameter Dn of the color particles were determined from the obtained distributions.

As for the channels, the following 13 channels were used: 2.00 µm or greater but smaller than 2.52 µm; 2.52 µm or greater but smaller than 3.17 µm; 3.17 µm or greater but smaller than 4.00 µm; 4.00 µm or greater but smaller than 5.04 µm; 5.04 µm or greater but smaller than 6.35 µm; 6.35 µm or greater but smaller than 8.00 µm; 8.00 µm or greater but smaller than 10.08 µm; 10.08 µm or greater but smaller than 12.70 µm; 12.70 µm or greater but smaller than 16.00 µm; 16.00 µm or greater but smaller than 20.20 µm; 20.20 µm or greater but smaller than 25.40 µm; 25.40 µm or greater but smaller than 32.00 µm; 32.00 µm or greater but smaller than 40.30 µm. The particles having diameters of 2.00 µm or greater but smaller than 40.30 µm were used as a target.

Examples 2 to 4 and Comparative Example 1

Color Particles 2 to 5 were each produced in the same manner as in Example 1, provided that the processing temperature and processing pressure in the multistage split flow micromixer 14 at the time of jetting the melt, and the nozzle diameter of the nozzle 32 were changed as depicted in Table 1.

Color Particles 2 to 5 were each subjected to the measurements of the viscosity of the melt under jetting conditions, volume average particle diameter Dv, number average particle diameter Dn, and ratio (Dv/Dn) in the same manner as in Example 1. The results are presented in Table 1.

Comparative Example 2

Production of color particles was attempted in the same manner as in Example 1, provided that the multistage split flow micromixer 14 illustrated in FIGS. 6A to 6D was not provided in the apparatus for producing particles 1 illustrated in FIG. 4. However, the viscosity of the melt was too high to form particles.

Comparative Example 3

The carbon dioxide and the melt were jetted under the atmospheric pressure in the same manner as in Example 1, provided that the following raw material of the particles was used, and the processing temperature and processing pressure inside the multistage split flow micromixer 14 during jetting the melt and the diameter of nozzle 32 were changed as depicted in Table 1. However, particles could not be formed.

<Particles Raw Material>
Polyethylene glycol (weight average molecular weight Mw: 20,000, product name: MACROGOL, manufactured by Sanyo Chemical Industries, Ltd.)

The color particles of each of Examples 1 to 4 and Comparative Example 1 were subjected to the measurement of the residual solvent amount in the following manner. The results are presented in Table 1-2.

<Measuring Method of Residual Solvent Amount>
To 1 part by mass of each of the color particles as a measurement target, 2 parts by mass of 2-propanol was added, and the resulting mixture was dispersed for 30 minutes by applying ultrasonic waves, followed by storing the resultant over 1 day or longer in a refrigerator (5° C.) to thereby extract the solvent in the color particles. A supernatant liquid thus obtained was analyzed by gas chromatography (GC-14A, SHIMADZU) to determine quantities of the solvent and residual monomers in the color particles, to thereby measure a concentration of the solvent. The measuring conditions for the analysis were as follows.

Device: SHIMADZU GC-14A
Column: CBP20-M 50-0.25
Detector: FID
Injection amount: 1 µL to 5 µL
Carrier gas: He, 2.5 kg/cm$^2$
Flow rate of hydrogen: 0.6 kg/cm$^2$
Flow rate of air: 0.5 kg/cm$^2$
Chart speed: 5 mm/min
Sensitivity: Range 101×Atten 20
Temperature of column: 40° C.
Injection temperature: 150° C.

TABLE 1-1

| | Particle No. | Pressure Plastic Material | Multistage split flow micromixer | Processing temperature (° C.) | Processing pressure (MPa) |
|---|---|---|---|---|---|
| Ex. 1 | Color Particles 1 | Polyester Resin 1 | Present | 120 | 5 |
| Ex. 2 | Color Particles 2 | Polyester Resin 1 | Present | 120 | 10 |
| Ex. 3 | Color Particles 3 | Polyester Resin 1 | Present | 135 | 6 |
| Ex. 4 | Color Particles 4 | Polyester Resin 1 | Present | 160 | 5 |
| Comp. Ex. 1 | Color Particles 5 | Polyester Resin 1 | Present | 100 | 20 |
| Comp. Ex. 2 | — | Polyester Resin 1 | Not present | 135 | 6 |
| Comp. Ex. 3 | — | Polyethylene glycol | Present | 120 | 20 |

TABLE 1-2

| | Viscosity of melt under jetting conditions (m Pa · s) | Nozzle diameter (µm) | Dv (µm) | Dn (µm) | Dv/Dn | Residual solvent amount |
|---|---|---|---|---|---|---|
| Ex. 1 | 450 | 400 | 72.4 | 9.39 | 7.71 | Detection limit or lower |
| Ex. 2 | 280 | 300 | 36.3 | 7.87 | 4.61 | Detection limit or lower |
| Ex. 3 | 140 | 200 | 24.1 | 6.73 | 3.58 | Detection limit or lower |
| Ex. 4 | 70 | 200 | 15.1 | 5.9 | 2.56 | Detection limit or lower |
| Comp. Ex. 1 | 550 | 500 | 108.6 | 11.3 | 9.61 | Detection limit or lower |

TABLE 1-2-continued

| | Viscosity of melt under jetting conditions (m Pa·s) | Nozzle diameter (μm) | Dv (μm) | Dn (μm) | Dv/Dn | Residual solvent amount |
|---|---|---|---|---|---|---|
| Comp. Ex. 2 | 5800 | 200 | Could not form particles | | | |
| Comp. Ex. 3 | 2000 | 500 | Could not form particles | | | |

The embodiments of the present invention are, for example, as follows:

<1> A method for producing particles, containing:

bringing a compressive fluid and a pressure plastic material into contact with each other using a multistage split flow micromixer, to thereby produce a melt of the pressure plastic material, in which the compressive fluid is dissolved; and jetting the melt of the pressure plastic material, to form particles, wherein the pressure plastic material is a resin having a carbonyl structure —C(=O)—, and wherein a viscosity of the melt is 500 mPa·s or lower, as measured under temperature and pressure conditions at the time of the jetting the melt of the pressure plastic material.

<2> The method according to <1>, wherein the multistage split flow micromixer contains:

a compressive fluid split section configured to split and guide the compressive fluid into a plurality of circular tube flow channels, after the compressive fluid is flown into the multistage split flow micromixer;

a double tube mixing section having a double tube structure composed of an inner tube into which the compressive fluid is flown in, and an outer tube provided to surround the inner tube, into which the pressure plastic material is flown in, where the double tube mixing section is provided in the number identical to a split number of the compressive fluid split section in a downstream area from the compressive fluid split section, and is configured to mix the compressive fluid and the pressure plastic material to form a contracted flow;

a contracted flow combining section, which is provided in a downstream area from the double tube mixing section, and is configured to combine contracted flows formed by a plurality of the double tube mixing section to form a mixed fluid;

a first split kneading section, which is provided in a downstream area from the contracted flow combining section, and contains a plurality of circular tube flow channels that divide the first split kneading section, in each of which the mixed fluid is flown in; and a second split kneading section containing circular tube flow channels, a number of which is not identical to the number of the circular tube flow channels of the first split kneading section, and which are provided in positions that are not coaxial to the circular tube flow channels of the first split kneading section.

<3> The method according to any of <1> or <2>, wherein the viscosity of the melt is 150 mPa·s or lower, as measured under temperature and pressure conditions at the time of the jetting the melt of the pressure plastic material.

<4> The method according to any one of <1> to <3>, wherein the bringing is bringing the pressure plastic material, which is heated and melted in advance, and the compressive fluid into contact with each other.

<5> The method according to any one of <1> to <4>, wherein a plurality of the multistage split flow micromixers are connected in the bringing.

<6> The method according to any one of <1> to <5>, wherein the compressive fluid contains supercritical carbon dioxide, or liquid carbon dioxide.

<7> Particles obtained by the method according to any one of <1> to <6>, wherein the particles are substantially free from an organic solvent.

<8> An apparatus for producing particles, containing:

a melting unit configured to bring a compressive fluid and a pressure plastic material into contact with each other using a multistage split flow micromixer, to produce a melt of the pressure plastic material, in which the compressive fluid is dissolved; and a granulating unit configured to jet the melt of the pressure plastic material, to form particles, wherein the pressure plastic material is a resin having a carbonyl structure —C(=O)—, and wherein a viscosity of the melt is 500 mPa·s or lower, as measured under temperature and pressure conditions at the time of the jetting the melt of the pressure plastic material.

<9> The apparatus according to <8>, wherein the multistage split flow micromixer contains:

a compressive fluid split section configured to split and guide the compressive fluid into a plurality of circular tube flow channels, after the compressive fluid is flown into the multistage split flow micromixer;

a double tube mixing section having a double tube structure composed of an inner tube into which the compressive fluid is flown in, and an outer tube provided to surround the inner tube, into which the pressure plastic material is flown in, where the double tube mixing section is provided in the number identical to a split number of the compressive fluid split section in a downstream area from the compressive fluid split section, and is configured to mix the compressive fluid and the pressure plastic material to form a contracted flow;

a contracted flow combining section, which is provided in a downstream area from the double tube mixing section, and is configured to combine contracted flows formed by a plurality of the double tube mixing section to form a mixed fluid;

a first split kneading section, which is provided in a downstream area from the contracted flow combining section, and contains a plurality of circular tube flow channels that divide the first split kneading section, in each of which the mixed fluid is flown in; and a second split kneading section containing circular tube flow channels, a number of which is not identical to the number of the circular tube flow channels of the first split kneading section, and which are provided in positions that are not coaxial to the circular tube flow channels of the first split kneading section.

<10> The apparatus according to any of <8> or <9>, wherein the melting unit contains a plurality of the multistage split flow micromixers connected to each other.

REFERENCE SIGNS LIST

1: apparatus for producing particles
11: bomb
12a: pump
12c: pump
13a: valve
13b: pressure-control valve
14: multistage split flow micromixer
24: pressure tank equipped with thermoregulator
32: nozzle
T: particles

The invention claimed is:

1. A method for producing particles, the method comprising:
   bringing a compressive fluid and a pressure plastic material into contact with each other using a multistage split flow micromixer to produce a melt of the pressure plastic material, in which the compressive fluid is dissolved; and
   jetting the melt of the pressure plastic material to form particles,
   wherein
   the pressure plastic material is a resin comprising a carbonyl structure —C(=O)—, and
   the melt has a viscosity of 500 mPa·s or lower, as measured under temperature and pressure conditions at the time of the jetting.

2. The method according to claim 1, wherein the multistage split flow micromixer comprises:
   a compressive fluid split section configured to split and guide the compressive fluid into a plurality of circular tube flow channels, after the compressive fluid is flown into the multistage split flow micromixer;
   a double tube mixing section comprising a double tube structure composed of an inner tube into which the compressive fluid is flown, and an outer tube surrounding the inner tube, into which the pressure plastic material is flown, where a number of the double tube mixing section is identical to a split number of the compressive fluid split section in a downstream area from the compressive fluid split section, and is configured to mix the compressive fluid and the pressure plastic material to form a contracted flow;
   a contracted flow combining section, which is provided in a downstream area from the double tube mixing section, and is configured to combine contracted flows formed by a plurality of the double tube mixing section to form a mixed fluid;
   a first split kneading section, which is provided in a downstream area from the contracted flow combining section, and contains a plurality of circular tube flow channels that divide the first split kneading section, in each of which the mixed fluid is flown; and
   a second split kneading section comprising circular tube flow channels, a number of which is not identical to a number of the circular tube flow channels of the first split kneading section, and which are provided in positions that are not coaxial to the circular tube flow channels of the first split kneading section.

3. The method according to claim 1, wherein the viscosity of the melt is 150 mPa·s or lower.

4. The method according to claim 1, wherein in the bringing, the pressure plastic material is heated and melted in advance.

5. The method according to claim 1, wherein the compressive fluid comprises supercritical carbon dioxide, or liquid carbon dioxide.

6. Particles obtained by a method comprising:
   bringing a compressive fluid and a pressure plastic material into contact with each other using a multistage split flow micromixer to produce a melt of the pressure plastic material, in which the compressive fluid is dissolved; and
   jetting the melt of the pressure plastic material to form particles,
   wherein
   the pressure plastic material is a resin comprising a carbonyl structure —C(=O)—,
   the melt is has a viscosity of 500 mPa·s or lower, as measured under temperature and pressure conditions at the time of the jetting, and
   the particles are substantially free from an organic solvent.

7. An apparatus for producing particles, the apparatus comprising:
   a melting unit configured to bring a compressive fluid and a pressure plastic material into contact with each other using a multistage split flow micromixer to produce a melt of the pressure plastic material, in which the compressive fluid is dissolved; and
   a granulating unit configured to jet the melt of the pressure plastic material to form the particles,
   wherein
   the pressure plastic material is a resin comprising a carbonyl structure —C(=O)—, and
   the melt has a viscosity of 500 mPa·s or lower, as measured under temperature and pressure conditions at the time of jetting the melt of the pressure plastic material.

8. The apparatus according to claim 7, wherein the multistage split flow micromixer comprises:
   a compressive fluid split section configured to split and guide the compressive fluid into a plurality of circular tube flow channels, after the compressive fluid is flown into the multistage split flow micromixer;
   a double tube mixing section comprising a double tube structure composed of an inner tube into which the compressive fluid is flown, and an outer tube surrounding the inner tube, into which the pressure plastic material is flown, where a number of the double tube mixing section is identical to a split number of the compressive fluid split section in a downstream area from the compressive fluid split section, and is configured to mix the compressive fluid and the pressure plastic material to form a contracted flow;
   a contracted flow combining section, which is provided in a downstream area from the double tube mixing section, and is configured to combine contracted flows formed by a plurality of the double tube mixing section to form a mixed fluid;
   a first split kneading section, which is provided in a downstream area from the contracted flow combining section, and comprises a plurality of circular tube flow channels that divide the first split kneading section, in each of which the mixed fluid is flown; and
   a second split kneading section comprising circular tube flow channels, a number of which is not identical to a number of the circular tube flow channels of the first split kneading section, and which are provided in positions that are not coaxial to the circular tube flow channels of the first split kneading section.

9. The apparatus according to claim 7, wherein the melting unit comprises a plurality of the multistage split flow micromixers connected to each other.

* * * * *